J. C. MACFARLANE & H. BURGE.
ELECTRICAL REGENERATIVE CONTROL APPARATUS AND SYSTEM.
APPLICATION FILED FEB. 7, 1910.
998,364.
Patented July 18, 1911.
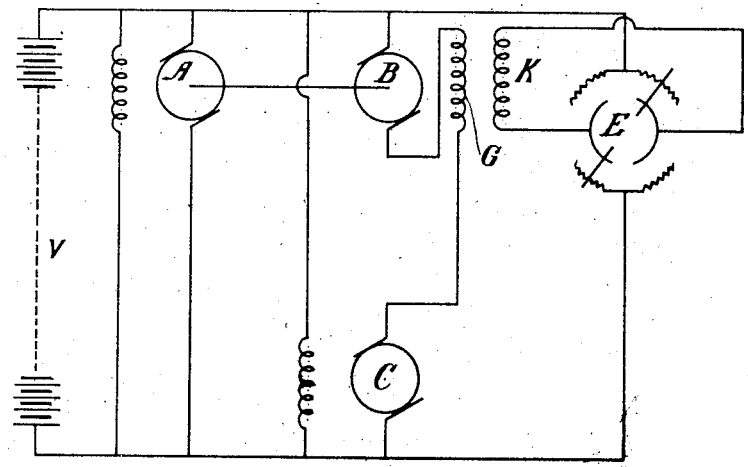
Witnesses:
Inventors
James C. Macfarlane
Harry Burge
By
James L. Norris
Atty

UNITED STATES PATENT OFFICE.

JAMES COLQUHOUN MACFARLANE AND HARRY BURGE, OF ARC WORKS, CHELMSFORD, ENGLAND, ASSIGNORS TO THE FIRM OF CROMPTON AND COMPANY LIMITED, OF ARC WORKS, CHELMSFORD, ENGLAND.

ELECTRICAL REGENERATIVE CONTROL APPARATUS AND SYSTEM.

998,364.  Specification of Letters Patent.  Patented July 18, 1911.

Application filed February 7, 1910. Serial No. 542,483.

*To all whom it may concern:*

Be it known that we, JAMES COLQUHOUN MACFARLANE and HARRY BURGE, subjects of the King of Great Britain, residing at Arc Works, Chelmsford, in the county of Essex, England, have invented certain new and useful Improvements in Electrical Regenerative Control Apparatus and Systems, of which the following is a specification.

This invention relates to improvements in electrical regenerative control apparatus and systems, such for example as are applied to trains, tramway cars, omnibuses, fly-wheel storage systems, and the like, and the invention has for its object to provide means for automatically fixing a safe limit to the current drawn from the supply mains and passing through the driven motor or motors.

According to the invention the apparatus comprises a motor-generator and one or more motors, all coupled together on the well known "Ward-Leonard" system, and to this system is applied a safety winding, consisting of a series field winding which is provided upon the generator element of the motor-generator.

The accompanying drawing shows a diagram of a motor-generator the dynamo portion of which is coupled in series with a motor across the line, the dynamo being provided with an auxiliary winding, the subject of this invention.

A and B are the motor and the generator elements respectively of a motor-generator, and C is a driven motor connected in series with the generator element B. A reversible shunt regulator E controls the field K of the generator element B in such a way that any voltage from zero to approximately twice the supply voltage V may be impressed on the motor C. The generator element is provided as shown in the drawing with a series field winding G whereof the magneto-motive-force is in opposition to the magneto-motive-force of the field winding K on the generator element B when the motor C is running as a motor at full speed, but when the motor C is regenerating at full speed, *i. e.*, returning current to the line, the magneto-motive-force of the series field winding G is exerted in the same direction as that of the field winding K. With this combination of series field winding G and field winding K, it will be seen that the series field winding G can, if properly proportioned, be made to automatically regulate the electromotive-force of the generator element B in such a manner that under any conditions the current passing through the motors cannot exceed a predetermined value. As an example, suppose the pressure across the line is 100 volts and that the generator B running at a constant speed and with a maximum positive excitation produces an additional 100 volts pressure making a total pressure on the element C of 200 volts. If the excitation of the generator B be now reversed by means of the shunt regulator E, it will exert a counter electro-motive-force of 100 volts and the pressure on the element C will consequently be zero. Any variation from no volts to 200 volts can therefore be impressed on the elment C, by means of the shunt coil K which is, therefore, the controlling field element. When the element C is acting as a motor the current taken by it depends on the load. If the load becomes very heavy and the speed of the motor C in consequence falls, its back electro-motive-force will be reduced, and consequently if the dynamo B is still supplying energy at a pressure of 200 volts a very large current would flow from the generator to the motor. According to this invention, this current is automatically reduced by means of the series field-winding G which serves to de-magnetize the generator B when current is flowing from the generator to the motor. As such de-magnetization is proportional to the current flowing it is clear that when the element C is acting as a motor, the series field winding G will prevent such current from rising to an abnormal value. The same effect is produced when owing to the fly-wheel effect of the element C or the momentum of the load, the element C continues running although all driving force is removed owing to the voltage delivered to the element C having been reduced to zero by means of the rheostat E. In this case, if the element C is still running at nearly its full speed, it will generate a back electro-motive-force of nearly 200 volts. This will tend to drive a large current in the reverse direction viz: from the motor to the generator and, as current passes through the series field winding G, in the reverse direction, it will magnetize the generator B positively and such generator B will consequently produce an electro-motive-force in a positive direction opposing such current. Consequently, when the element C is acting as a generator and returning energy to the line, the series field winding G will again prevent such reversed current from rising unduly. Again, if the motor C were stationary and if the regulator E were suddenly put over to the full speed position, the supply mains would be momentarily short-circuited through said motors, but the action of the series field winding G reduces the current to the limiting value.

It will be seen that the sign of the shunt field winding K depends upon the position of the regulator E, and the sign of the field due to the winding G depends on whether the element C is acting as a motor or a generator. Generally the windings K and G oppose each other, but a case may arise when it is desired to reduce the speed, where the regulator E has not been actually reversed, so that the generator is still giving a low positive voltage which is not sufficient to keep the reverse current from the element C within safe limits, and in that case, the winding G will produce a positive field of the same sign as that of the winding K and of greater magnitude. Hence cases may arise in which the field due to the winding G is greater than that due to the winding K.

What we claim is:—

1. An electrical regenerative control system comprising, a motor generator having a motor element and a generator element, a motor connected in series with said generator element, a reversible shunt regulator for controlling the field of said generator element so that any voltage from zero to approximately twice the supply voltage may be impressed upon said motor, and means upon said generator element for limiting the current drawn from the supply mains.

2. An electrical regenerative control system comprising, a motor generator having a motor element and a generator element, a motor connected in series with said generator element, a reversible shunt regulator for controlling the field of said generator element, and a series field winding upon said generator element for limiting the current drawn from the supply mains.

In testimony whereof we have hereunto set our hands in presence of two subscribing witnesses.

JAS. COLQUHOUN MACFARLANE.
HARRY BURGE.

Witnesses:
HARRY J. STOGDEN,
ERNEST JOHN HILL.